J. GRANZ.
MOTION PICTURE MACHINE.
APPLICATION FILED MAR. 28, 1919.
1,349,421.
Patented Aug. 10, 1920.
3 SHEETS—SHEET 2.
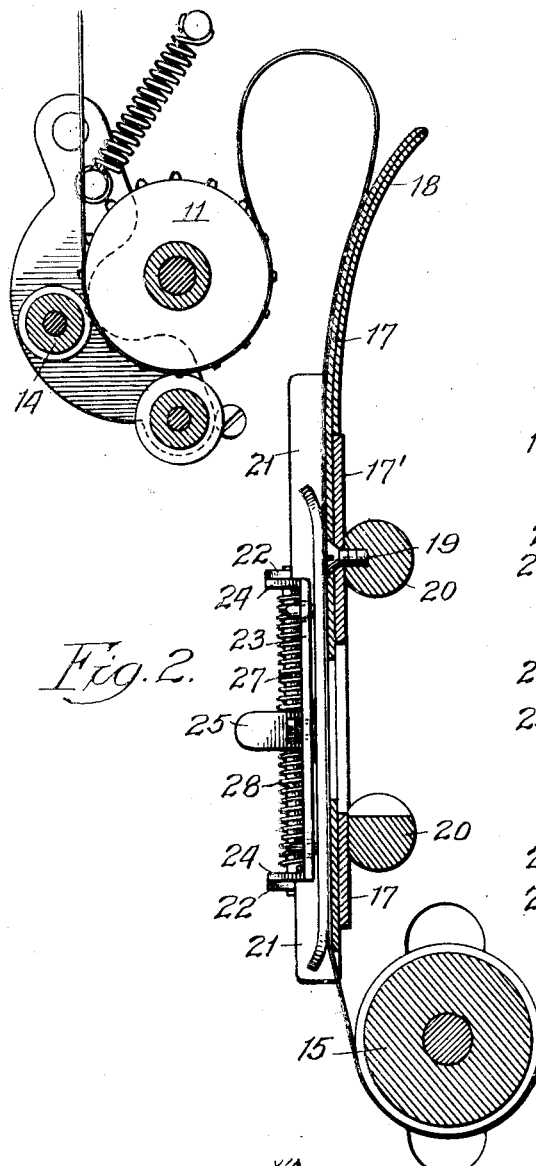
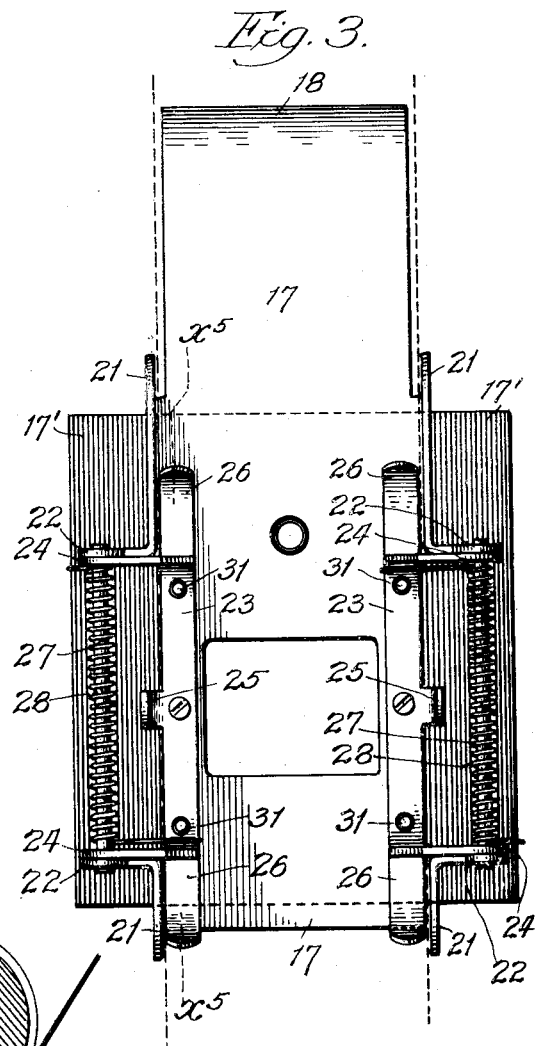
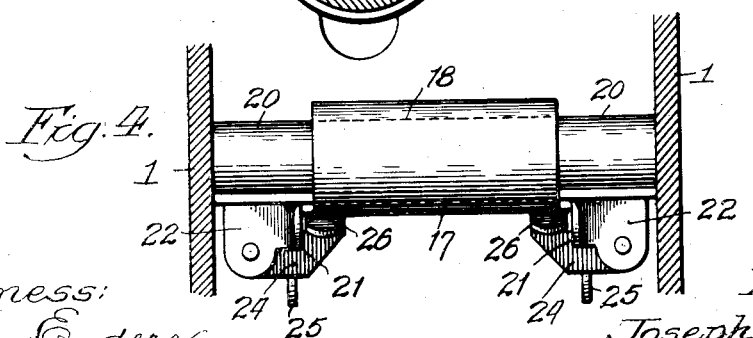
Witness:
John Enders
Inventor:
Joseph Granz,
by Robert Burns,
Atty.

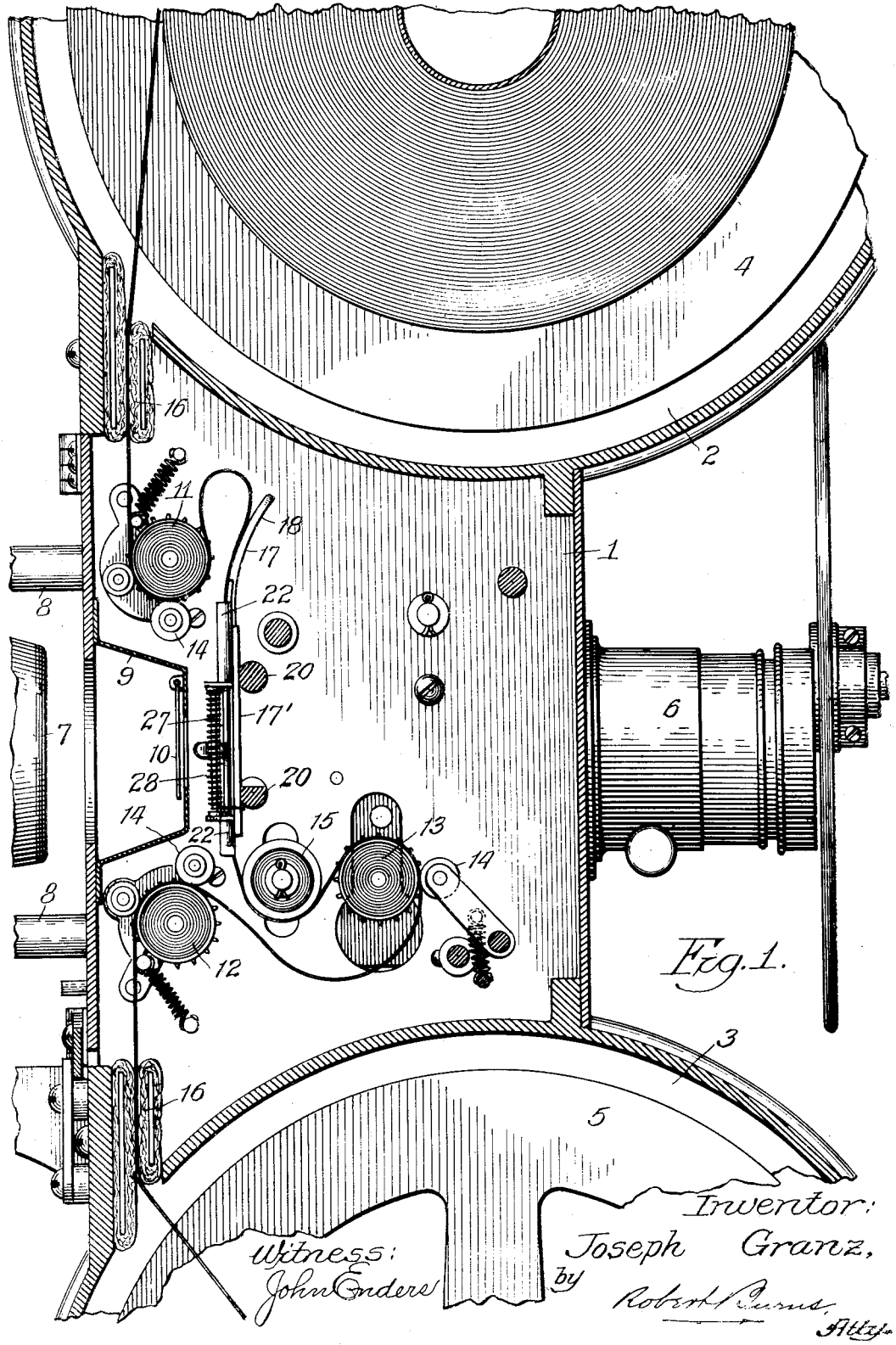

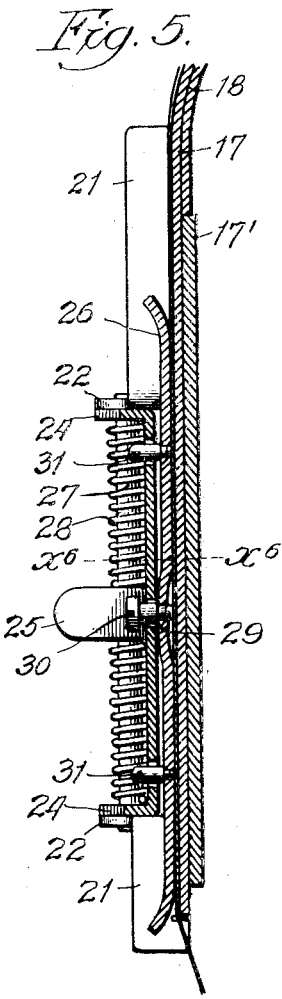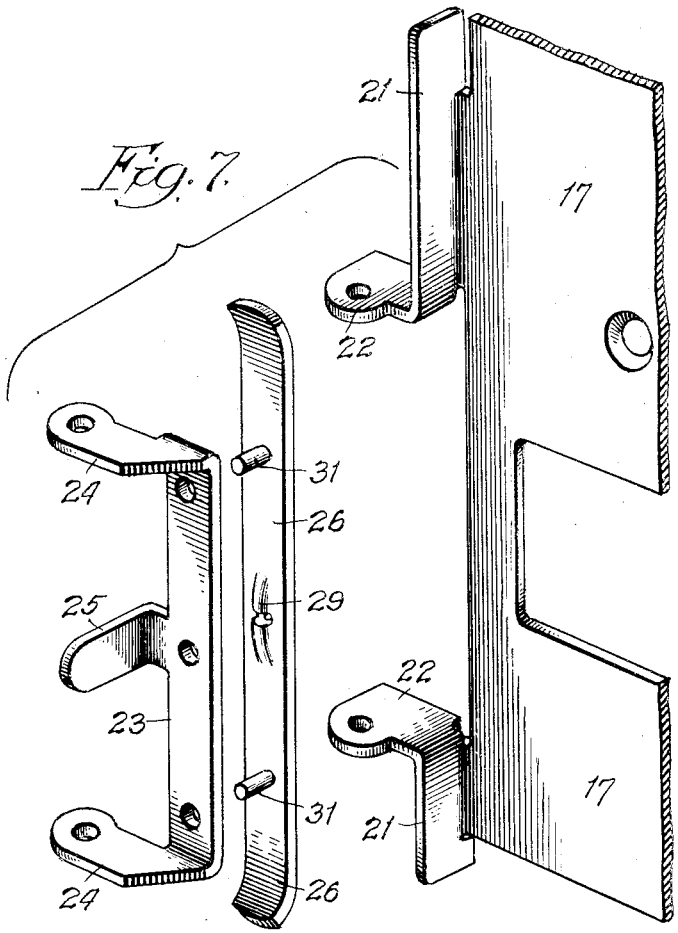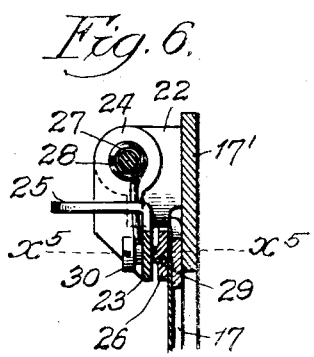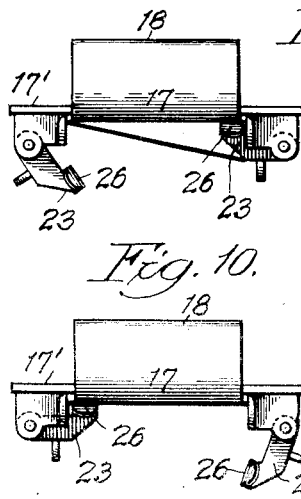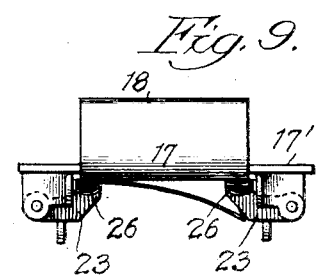

UNITED STATES PATENT OFFICE.

JOSEPH GRANZ, OF DULUTH, MINNESOTA.

MOTION-PICTURE MACHINE.

1,349,421.  Specification of Letters Patent.  Patented Aug. 10, 1920.

Application filed March 28, 1919. Serial No. 285,759.

*To all whom it may concern:*

Be it known that I, JOSEPH GRANZ, a native of Austria, (who has declared his intention of becoming a citizen of the United States of America,) and a resident of Duluth, in the county of St. Louis, State of Minnesota, have invented certain new and useful Improvements in Motion - Picture Machines, (Case 2,) of which the following is a specification.

This invention relates to that class of motion picture machines in which a band of picture film is fed past the light aperture of the machine, and has for its objects:—

To provide a structural formation and combination of the apertured film guiding plate and associated film confining and guiding gate, adapted to provide an easy threading and unthreading of the picture film in and from the mechanism and by means of which the films are held in a straight path and with an avoidance of vibratory movement or the like.

To provide in connection with the aperture plate and confining gate, a simple and efficient manually operated means for cutting off the light rays from the picture film, as a fire preventative precaution in the starting and stopping of the operation of the machine, all as will hereinafter more fully appear.

In the accompanying drawings:—

Figure 1, is a detail longitudinal sectional elevation illustrating general construction and arrangement of parts in the present improvement.

Fig. 2, is an enlarged detail vertical section of the film supply mechanism, film guide and confining gate and film framing drum of the present structure.

Fig. 3, is an enlarged front elevation of the apertured guide plate and film confining gate of the structure.

Fig. 4, is an enlarged plan view of the same.

Fig. 5, is an enlarged detail vertical section on line $x^5$—$x^5$, Figs. 3 and 6.

Fig. 6, is an enlarged detail horizontal section on line $x^6$—$x^6$, Fig. 5.

Fig. 7, is a sectional perspective view of the aperture plate and film confining gate parts in a detached condition.

Figs. 8, 9 and 10, are a series of detail plan views of the aperture plate and associated confining gate, showing the series of positions of the gate parts in the operation of threading the film.

Like reference numerals indicate like parts in the several views.

Referring to the drawings, 1 designates the main casing of the machine, preferably of the rectangular box form shown, and forming the main chamber of the machine and adapted to contain the film actuating drums, film guiding means, etc.

2 and 3 designate contiguous portions of the respective upper and lower film magazines of the usual drum form and adapted to receive in a replaceable manner the film reels 4 and 5 of the machine. The magazines 2 and 3, are fixedly secured to the respective upper and lower ends of the casing 1 and are provided with tangentially arranged film apertures which open into the chamber of the casing 1 in vertically alined relation to the film supply and film take-up drums of the machine.

6 designates the objective or front lens member secured to the front wall of the casing 1 and on the optical center of the machine, and 7 designates the condenser or rear lens member secured to the rear wall of the casing 1 by horizontal posts 8 as set forth in detail in my companion application for Letters Patent, Serial No. 285,758, filed March 28, 1919.

9 designates an apertured shell secured with the main casing 1 and to the rear wall of the same with its aperture on the optical center of the machine.

10 designates a hinged gate of a plate form associated with the aperture of the shell 11 and having an operating shaft extending outside the main casing 1 for convenient manual operation when it is desired to cut-off the light rays from the usual apertured guide plate of the picture film, as a fire preventative precaution in a practical operation of the machine.

In the present structure the film supply sprocket drum 11 of the heretofore referred to film actuating means is arranged in the upper rear portion of the casing 1, with the film take-up sprocket drum 12 arranged in the lower rear portion of said casing 1, and in vertical alinement with the film apertures of the magazines 2 and 3 before described, while the intermittently actuated film feeding sprocket drum 13 is arranged forward of said film take-up sprocket drum 12 as shown.

14 designates the usual adjustable bearing rollers by which the picture film is held in proper operative engagement with the sprocket drums 11, 12 and 13 aforesaid.

15 designates a bearing roller or drum arranged intermediate of the film take-up drum 12 and the intermittent film feeding drum 13 aforesaid, and capable of vertical adjustment by hand, preferably in the manner described in my aforesaid application for Letters Patent, Serial No. 285,758. The roller 15 is adapted to engage in a loop of the picture film and the arrangement is such that an adjustment of said drum 15 is adapted to attain an independent movement of the picture film past the right aperture of the machine to attain a proper framing of the pictures on said film.

16 designates guide throats formed by opposed pads of fibrous or like elastic material, and arranged at the before mentioned film apertures of the magazines 2 and 3, and adapted to prevent a local combustion of the film within the casing 1 extending into the magazines.

17 designates the vertically arranged apertured guide plate by which the picture film is properly supported in its intermittent travel through the light path or optical center of the machine, and to such end the said plate 17 is disposed between the film supply drum 11 and the film take-up drum 12 aforesaid. In the present construction the plate 17 is formed with a rearwardly curved end or breast 18, and is removably secured in place by screws 19 passing through the main portion of the plate and screwing into bar or bars 20 fixedly secured in a transverse direction in the main casing 1. In the preferred construction of the aperture plate 17 the same is of a sectional form and comprises a stiffening plate portion 17' having an opening larger than the regular light aperture of the machine, and adapted to support the bearing plate portion 17 for the picture film. Said bearing plate portion 17 is formed of thinner metal than the supporting plate 17' with its upper end closely folded upon itself to constitute the curved breast 18 aforesaid, with the lower end of the fold abutting against the upper end of the supporting plate 17' as shown more particularly in Figs. 2 and 5.

21 designates upper and lower vertical flanges formed at the sides of the aperture plate 17 to constitute side guides for the picture film, and to such end are disposed in spaced relation to each other corresponding with the width of said film.

22 designates horizontal flanges or pivot ears formed on the opposed lower and upper ends of the upper and lower flanges 21 aforesaid, for the pivotal attachment of gate members as follows:

23 designates a pair of gate members or sections having vertical main portions corresponding in height to the vertical spaces between the upper and lower flanges 21 aforesaid, so as to fit between the same. Each of the gate members 23 is provided with lateral ears or flanges 24 corresponding with the pivot ears 22 of the plate 17, for pivotal association, and with an angularly disposed finger or flange 25 for convenient manual operation of the gate member.

26 designates a pair of bearing shoes or runners individual to the gate members 23 aforesaid, and loosely connected thereto in the manner hereinafter described so as to have even and extended bearing against the passing film.

27 designates the vertical pivot pin or pintle by which the pivot ears of a gate member 23 and the pivot ears 22 of the aperture plate 17 are pivotally connected together.

28 designates a coiled spring encircling the pivot pin 27 and adapted to yieldingly hold the gate member 23 and its associated shoe or runner 26 in bearing contact with the picture film in actual use.

29 designates a rounded bearing ridge formed at the mid-length and mid-width of a shoe or runner 26 aforesaid, and adapted to provide a central rocking bearing or contact between said shoe or runner and the gate member aforesaid.

30 designates a headed screw or rivet connecting a shoe or runner 26 and a gate member 23 together in a loose manner, preferably by the shank of the screw 30 fitting an enlarged orifice in the gate member 23 as shown.

31 designates steady pins projecting from the upper and lower portions of the shoes or runners 26 and fitting enlarged orifices in the respective gate members 23, to limit the extent of independent lateral movement or play between the parts.

In the operation of the present gate structure, the operator opens the gate member 23 at one edge of the picture film to permit an entrance of such edge of the film beneath said gate member. And by a subsequent opening of the companion gate member 23, the other edge of the picture film will by its normal elasticity move into place against the aperture plate 17 and beneath the last mentioned gate member 23.

Having thus fully described my said invention, what I claim as new and desire to secure by Letters Patent, is:—

1. In a motion picture machine, a main frame or casing, a film guide plate arranged vertically in said frame and provided with a light aperture, means for feeding a picture film along said guide plate and counterpart spring impelled gate members hinged at the vertical sides of said guide plate, substantially as set forth.

2. In a motion picture machine, a main frame or casing, a film guide plate arranged vertically in said frame and provided with a light aperture, means for feeding a picture film along said guide plate and counterpart spring impelled gate members hinged at the vertical sides of said guide plate and provided with shoes or runners adapted to bear upon the margins of the passing film, substantially as set forth.

3. In a motion picture machine, a main frame or casing, a film guide plate arranged vertically in said frame and provided with a light aperture, means for feeding a picture film along said guide plate, confining spring impelled gate members hinged at the vertical sides of said guide plate and provided with shoes or runners adapted to bear upon the margins of the passing film, each shoe or runner having a bearing ridge disposed midway the height and width of the shoe or runner, and a headed attaching member extending from said ridge and passing through an enlarged orifice in a gate member, substantially as set forth.

4. In a motion picture machine, a main frame or casing, a film guide plate arranged vertically in said frame and provided with a light aperture, means for feeding a picture film along said guide plate, confining spring impelled gate members hinged at the vertical sides of said guide plate and provided with shoes or runners adapted to bear upon the margins of the passing film, each shoe or runner having a bearing ridge disposed midway the height and width of the shoe or runner, a headed attaching member extending from said ridge and passing through an enlarged orifice in a gate member and steady pins on said shoe or runner engaging enlarged orifices in said gate member, substantially as set forth.

5. In a motion picture machine, a main frame or casing having a fixed transverse bar or rod, a film guide plate detachably secured thereto and provided with a light aperture, means for feeding a picture film along said guide plate and counterpart spring impelled gate members hinged at the vertical sides of said guide plate, substantially as set forth.

6. In a motion picture machine, a main frame or casing having a fixed transverse bar or rod, a film guide plate detachably secured thereto and provided with a light aperture, means for feeding a picture film along said guide plate, counterpart spring impelled gate members hinged at the vertical sides of said guide plate and provided with shoes or runners adapted to bear upon the margins of the passing film, substantially as set forth.

7. In a motion picture machine, a main frame or casing, a film guide plate arranged vertically in said frame and provided with a light aperture and with side guide flanges having pivot ears, counterpart confining gate members provided with lateral pivot ears and pivot rods and actuating springs forming spring impelled connections between the guide plate and the gate members, substantially as set forth.

8. In a motion picture machine, a main frame or casing, a film guide plate arranged vertically in said frame and provided with a light aperture and with side guide flanges having pivot ears, counterpart confining gate members provided with lateral pivot ears, pivot rods and actuating springs forming spring impelled connections between the guide plate and the gate members, and shoes or runners carried by the gate members and adapted to bear upon the margins of the passing film, substantially as set forth.

9. In a motion picture machine, a main frame or casing, a film guide plate arranged vertically in said frame and provided with a light aperture and with side guide flanges having pivot ears, counterpart confining gate members provided with lateral pivot ears, and pivot rods and actuating springs forming spring impelled connections between the guide plate and the gate members, and shoes or runners carried by the gate members and adapted to bear upon the margins of the passing film, each shoe or runner having a bearing ridge disposed midway the height and width of the shoe or runner and a headed attaching member extending from said ridge and passing through an enlarged orifice in a gate member, substantially as set forth.

10. In a motion picture machine, a main frame or casing, a film guide plate arranged vertically in said frame and provided with a light aperture and with side guide flanges having pivot ears, counterpart confining gate members provided with lateral pivot ears, pivot rods and actuating springs forming spring impelled connections between the guide plate and the gate members, and shoes or runners carried by the gate members and adapted to bear upon the margins of the passing film, each shoe or runner having a bearing ridge disposed midway the height and width of the shoe or runner, a headed attaching member extending from said ridge and passing through an enlarged orifice in a gate member and steady pins on said shoe or runner engaging enlarged orifices in said gate member, substantially as set forth.

11. In a motion picture machine, a main frame or casing having a fixed transverse bar or rod, a film guide plate detachably secured thereto and provided with a light aperture, said guide comprising a flat under plate portion and an outer bearing plate portion having a closely folded upper part forming a curved guide breast with the lower end of the fold abutting against the upper end of the under plate, and counterpart spring impelled gate members hinged at the vertical sides of said guide plate, substantially as set forth.

12. In a motion picture machine, a main frame or casing having a fixed transverse bar or rod, a film guide plate detachably secured thereto and provided with a light aperture, said guide comprising a flat under plate portion and an outer bearing plate portion having a closely folded upper part forming a curved guide breast with the lower end of the fold abutting against the upper end of the under plate portion, counterpart spring impelled gate members hinged at the vertical sides of said guide plate and provided with shoes or runners adapted to bear upon the margins of the passing film, substantially as set forth.

13. In a motion picture machine, a main frame or casing having a fixed transverse bar or rod, a film guide plate detachably secured thereto and provided with a light aperture, said guide comprising a flat under plate portion and an outer bearing plate portion having a closely folded upper part forming a curved guide breast with the lower end of the fold abutting against the upper end of the under plate, the said outer portion having side guide flanges formed with lateral pivot ears, counterpart confining gate members provided with lateral pivot ears, and pivot rods and springs forming spring impelled connections between the guide plate and the gate members, substantially as set forth.

14. In a motion picture machine, a main frame or casing, a film guide plate arranged vertically in said frame and provided with a light aperture, means for feeding a picture film along said guide plate and counterpart spring impelled gate members hinged at the vertical sides of the guide plate, a casing secured to the inner front wall of the main casing and having an aperture in line with the aperture of the guide plate, and a hinged shutter controlling the aperture of said casing and having a horizontal carrying shaft, substantially as set forth.

Signed at Duluth, Minn., this 24th day of March, 1919.

JOSEPH GRANZ.